Sept. 21, 1954     R. C. JOHNSON     2,689,560
COMBINATION WATER AND WARM AIR HEATING SYSTEM
Filed Aug. 30, 1950     3 Sheets-Sheet 1
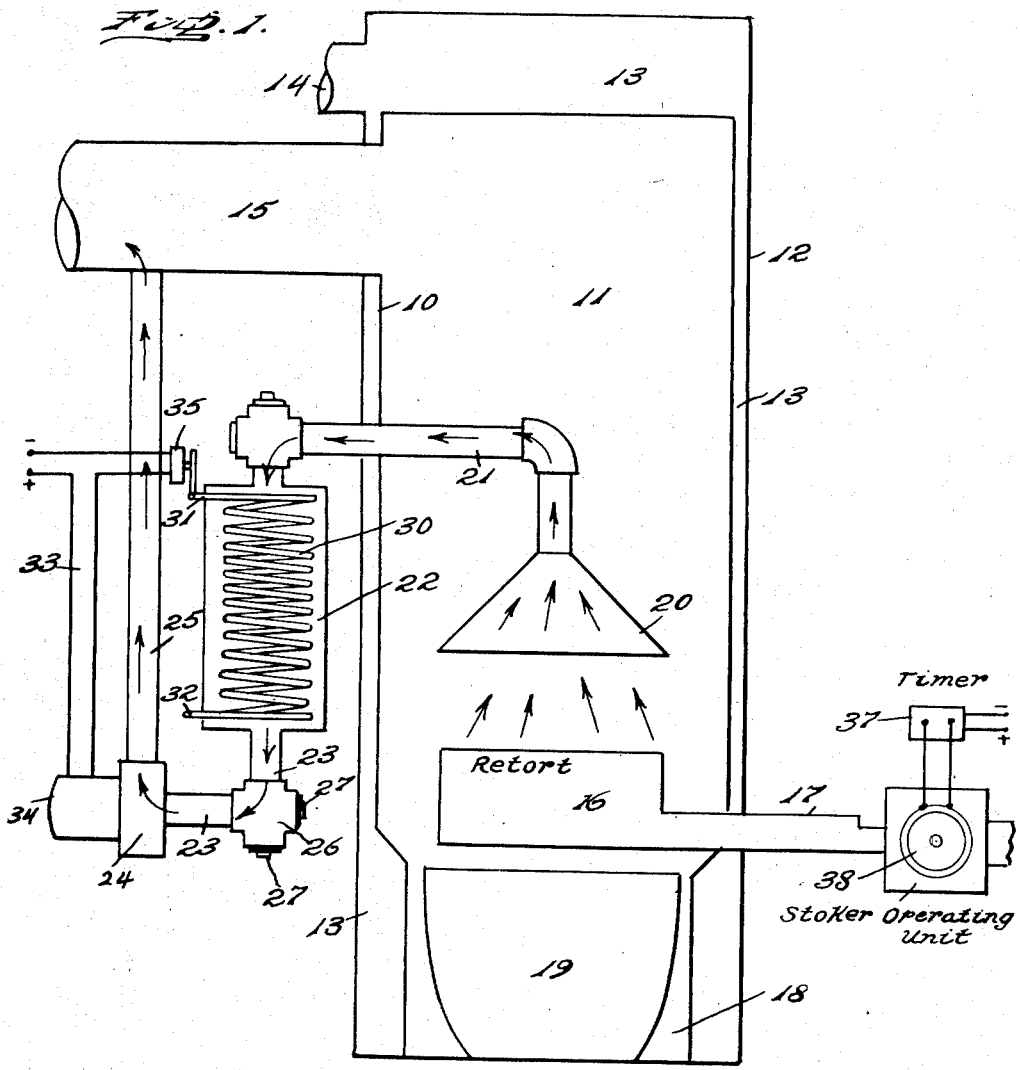
INVENTOR
Raymond C. Johnson,
BY
Barr, Borden & Fox
ATTORNEYS.

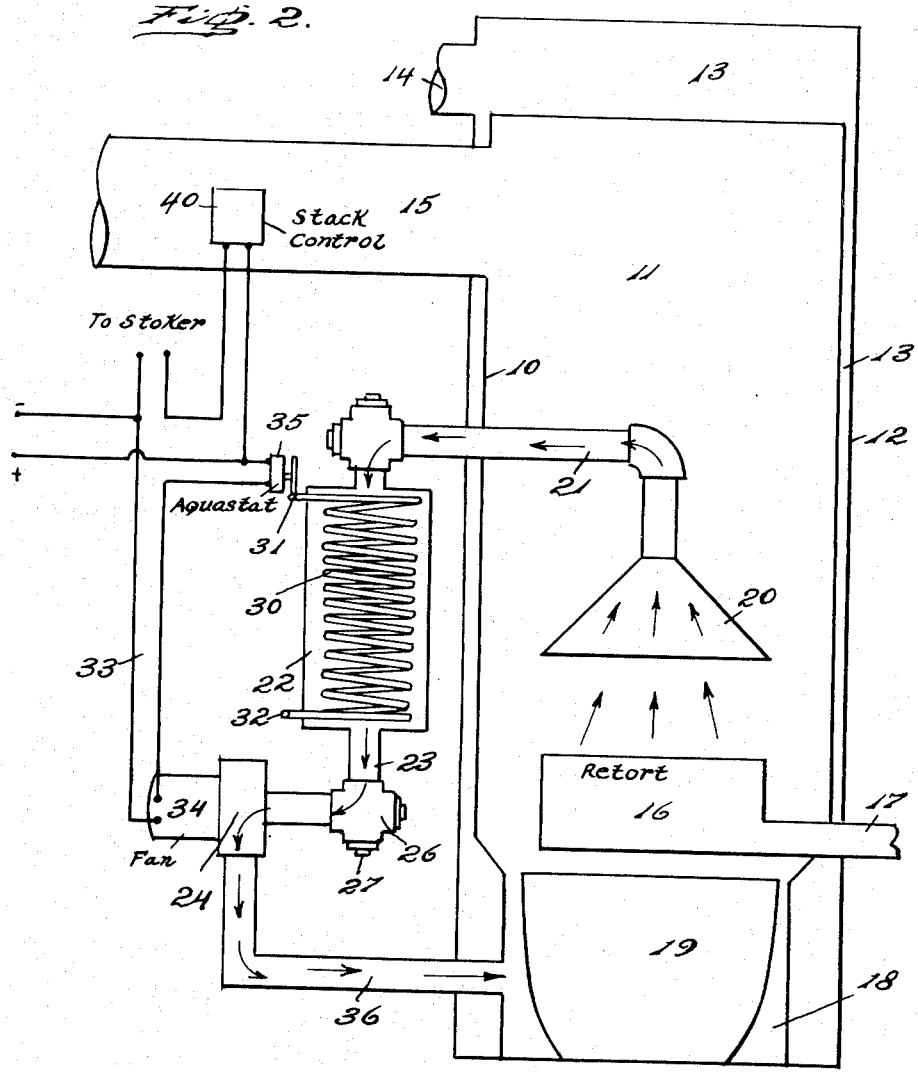

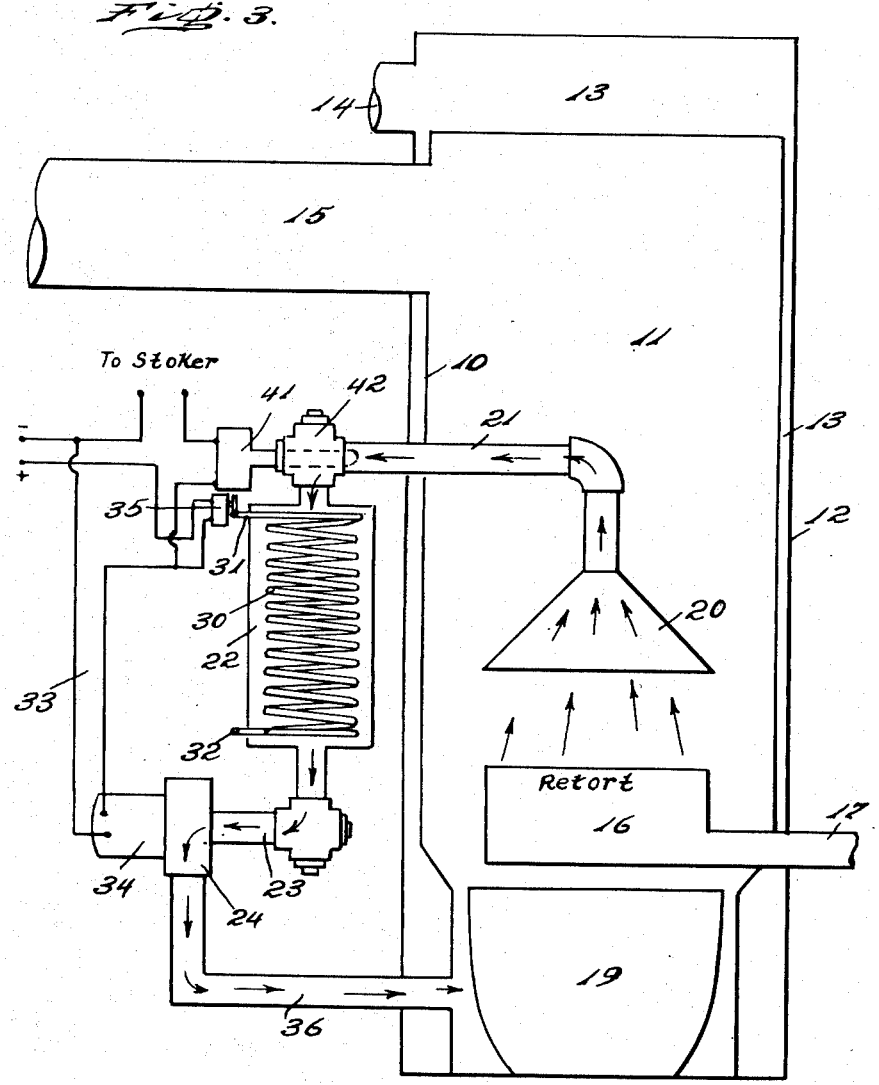

Patented Sept. 21, 1954

2,689,560

UNITED STATES PATENT OFFICE 2,689,560

COMBINATION WATER AND WARM AIR HEATING SYSTEM

Raymond C. Johnson, Wilkes-Barre, Pa., assignor to Anthracite Equipment Corporation, Wilkes-Barre, Pa., a corporation of Delaware Application August 30, 1950, Serial No. 182,220

7 Claims. (Cl. 126—101)

The present invention relates generally to coal burning warm air heaters and more particularly to the heating of water from a warm air heater for domestic use during the summer as well as the winter.

In warm air heaters used for house heating it has heretofore been proposed to utilize the gases in the combustion chamber as a means for heating water for domestic purposes, such generally comprising a water-circulating coil mounted in the combustion chamber above the bed of burning fuel. Such coils have not proved satisfactory because the diverted heat units reduce the efficiency of the furnace as a house heater and furthermore under maximum operation of the heater the coils develop dangerous pressures, thereby necessitating installation of safety valves. Also, the coils corrode and burn out and have to be repaired. Assemblies of this type are inoperative to supply domestic hot water during the summer because entirely dependent upon maintaining an active fuel bed in the furnace so that both the house and the water are heated at the very time a cool house is required.

Some of the objects of the present invention are: to provide a successful domestic water heater in association with a coal burning warm air furnace; to provide a so-called summer and winter hook-up for a coal burning warm air furnace to furnish hot water for domestic use the year around; to provide a coal burning warm air furnace wherein provision is made for maintaining a substantially constant predetermined temperature in a supply of water; to provide a coal burning warm air furnace wherein provision is made for heating a supply of water for domestic use while rendering the furnace ineffective for house heating; to provide a novel dual control for a combined stoker-fired warm air furnace and a domestic water heater wherein provision is made for maintaining a predetermined water temperature while automatically regulating the stoker operation in accordance with outdoor summer and winter temperatures; and to provide other improvements as will hereinafter appear.

In the accompanying drawings, Fig. 1 is a diagrammatic representation of a warm air furnace and domestic water heater embodying one form of the present invention; Fig. 2 is a diagrammatic representation of a warm air furnace and domestic water heater embodying a modified form of the invention; and Fig. 3 is a diagrammatic representation of a warm air furnace and domestic water heater embodying a further modification of the invention.

Referring to Fig. 1 of the drawings, a conventional warm air furnace is shown comprising an inner shell 10 forming the combustion chamber 11 housed in the outer casing 12 which is spaced from the shell 10 to provide the usual space 13 in which the air is heated for circulation through the communicating house heating duct 14. The combustion chamber 11 is in communication with the flue pipe 15 for discharge of waste gases. In the present instance, for illustrative purposes only, the furnace is heated by stoker-fed coal to a retort 16 of conventional type, worm fed and air supplied by tube 17 passing through the furnace walls from the exterior thereof. Detailed description of the retort and associated parts are believed unnecessary here because well known, though it may be mentioned that the retort preferably forms a circular fire bed. The bottom portion of the shell 10, below the retort 16, provides an ashpit 18 in which an ash can 19 can be located to collect ashes discharged from the retort 16.

In order to utilize some of the heat units, developed by the operation of the retort 16, for domestic water heating, an inverted funnel 20 is supported in axially disposed spaced relation above the retort 16 for collecting and drawing off some of the products of combustion when desired by way of a pipe 21 leading through the walls of the furnace to an insulated covered heat exchanger unit, which, as here shown, comprises an enclosed chamber 22 communicating at the top with the pipe 21 and at the bottom with a suction pipe 23 leading to the inlet of an electric motor operated exhaust fan 24. It should be noted that the mouth of the funnel 20 has a diameter preferably such as to gather in the vertically rising hot gases from the retort 16 while forming an annular passage with the walls of the combustion chamber to direct other rising hot gases along the walls of the combustion chamber. This is an important dimensional construction because under summer conditions with a low fire the draft induced through the water heater so materially reduces the volume of hot gases rising through the aforesaid annular passage as to eliminate the heating of the walls of the chamber for all practical purposes. Hence, no heat is delivered to the house while ample hot water is available. The discharge of the fan 24 is by way of a pipe 25 leading in this instance to the flue pipe 15. Axially located below the chamber 22 there is a fly ash-collecting box 26 through which the drawn off auxiliary combustion gases pass by way of the pipe 23. Removable closures 27 provide access to the box 26 for cleaning purposes. A water circulating coil 30 is coaxially mounted in the chamber 22 having top and bottom end pipes 31 and 32 preferably leading respectively to different levels in a water storage tank (not shown) of the proper size for the particular domestic requirements.

For controlling the hot products of combustion drawn through the heat exchanger in order to maintain substantially a predetermined temperature of the water delivered for domestic use, provision is made to automatically start the fan 24 when the water temperature falls below the selected temperature setting and to automatically stop the fan 24 when the water temperature rises to the selected temperature setting. Such automatic conrol is preferably obtained by including in the operating electrical circuit 33 of the motor 34 for the fan 24 a thermostatic switch unit 35, such as an aquastat, located to respond to the temperature of the heated water and set for the respective selected limit temperatures for proper operation. Preferably the switch unit 35 is mounted upon the water outlet coil pipe 31 for control purposes, but may be attached to a water storage tank, if used, with which the coil 30 communicates for circulation purposes.

In the modifications of Figs. 2 and 3, those parts common to Fig. 1 are identified by like reference numerals because the general assembly can be followed from the description of Fig. 1, and thus avoid undue repetition. One modification of the invention shown in Figs. 2 and 3 comprises the return of the circulated auxiliary products of combustion from the fan 24 by way of pipe 36 to the ashpit 18, whereby any residual heat units become available in the combustion chamber 11.

Broadly considered, the invention provides a novel means for maintaining a substantially constant water temperature in a domestic heating system including a warm air heater and which functions efficiently whether the heater is operating at a maximum or minimum coal burning rate. Primarily, the object of the invention is to provide domestic water heating during the summer months while operating the coal burning warm air heater at such low fuel supply rate that no undesirable warm air is delivered to the house. This can be accomplished in the case of a hand-fired heater by controlling the draft to the fire, and in the case of a stoker-fired heater by controlling the rate or the frequency of the coal feed. The foregoing object is obtained in each of the three forms of the invention shown, as will now be described.

In Fig. 1 the control of feeding of the coal to the retort 16 is by means of an electric timer 37 included in the circuit of the motor 38, which latter operates the coal-feeding worm and air supply through a gear box or other well known mechanism. Depending upon the outdoor temperature or other conditions, the timer 37 is set to start and stop the motor 38 at variable times to obtain the desired size of the fuel bed for the existing condition. Thus, for low fire conditions, the timer 37 may be set for ten minutes on and twenty minutes off, or for whatever time intervals will produce the desired result. In the case of stoker operation, the low coal feeding setting will produce an axially located circular live coal bed of such small diameter that sufficient heat units are available only to maintain effective heating of the exchanger coils 30, while the air, if any, delivered to the house system carries no unwanted heat units. While such low setting is particularly for summer use, it can be made at any time to vary operating conditions.

In the control form of the invention shown in Fig. 2 a thermostatic switch unit 40, settable for maximum and minimum limit temperatures is located in the stack flue 15 to respond to flue gas temperature and, as shown, is connected in a series electrical circuit including the motor 38 for the stoker or for a fuel bed blower, as the case may be. For example, the switch unit 40 may have a temperature setting of 100° F. to 200° F., in which case when the flue gases reach the temperature of 200° F., the stoker is turned off and when the temperature falls to 100° F., the stoker is put into operation. Preferably the switch unit 35, or aquastat, while in series circuit with the fan motor 34, is also in parallel circuit with the motor 38 and therefore in conjunction with the unit 40, the stoker or other fuel supply is controlled as a function of the stack temperature. This operation is as follows: When both the stack temperature and the water temperature are low, the two switch units 35 and 40 close the respective circuits so that the stoker and exhaust fan operate together. When the water temperature reaches the maximum setting of the unit 35, its switch opens to stop the fan 24 but the fire is still held because the stoker operation is under stack control. When the flue temperature reaches the maximum limit before the water temperature reaches its maximum, then switch unit 40 opens the stoker circuit to stop the stoker, but as the switch of the water temperature unit 35 is still closed, the fan continues to draw gases from the combustion chamber until such time as the water temperature reaches its maximum.

In the control form of the invention shown in Fig. 3, a thermostatic switch unit 41 is mounted in the fitting 42 to respond to the temperature of the gases in the pipe 21 as drawn off by the fan 24. The switch unit 41 is of the type settable for maximum and minimum limit temperatures of the auxiliary combustion gas. Preferably the unit 41 is in a series circuit including the stoker or other fuel control and the water temperature control switch unit 35, while the latter is also in a parallel circuit including the fan 24 in series with such aquastat 35. Therefore, the temperature of the water being heated controls both the operation of the stoker and the operation of the exhaust fan 24. Thus the electrical control system includes two circuits connected in parallel, both of which include the aquastat 35, one of such circuits further including the switch 41 and the stoker in series in that circuit, the other of which circuits includes the fan motor 34 in series therein. Under a certain condition both the stoker and the fan will be operating simultaneously. Under another condition both stoker and fan will be stopped. Under still another condition the stoker will be stopped while the fan will continue to operate. It will thus be seen that the aquastat 35 is the master control since it is wired in series with the exhaust fan and in series with the thermostatic switch 41. Thus, when the temperature of the water circulating through the water heater reaches the selected maximum, the aquastat 35 stops the exhaust fan and the thermostatic switch 41 is inactive. When the water temperature is below the maximum setting of the aquastat the exhaust fan is turned on and the thermostatic switch 41 operates the stoker to control the temperature of he gases in pipe 21 below the set limits of the switch. In normal operation, when the exhaust fan is running, the switch 41 will turn the stoker off and on a number of times before the water in the heater and the storage system is brought up to temperature. The function of the switch 41 is to maintain the temperature of the gas passing through the pipe 21 and the water heater between the settable heat limits, in contrast to the aquastat 35, which is only set to give a maximum limit temperature of water and no minimum limit.

It will now be apparent that a novel combined warm air heater and water heating system has been devised wherein fuel supply control for both the warm air heater and the water heater function under predetermined temperature ranges to maintain both maximum water and air temperatures, or maximum water temperature and minimum air temperatures, so that the combined system makes it possible to obtain efficient operation both during the winter and summer months. In connection with the funnel 20, it should be noted that while primarily it is an inlet to by-pass hot gases, it also functions as a baffle to increase the efficiency of the heater when operating as a warm air heater. While the system is described as of the coal-fired type, it is also applicable to warm air furnaces fired with liquid and/or gaseous fuels.

Having thus described my invention, I claim:

1. In a combined water and warm air heating system, the combination of a warm air furnace including a combustion chamber communicating with a main discharge flue, and a casing forming an air space in heat exchange relation to said chamber, a fuel-burning retort in said chamber, fuel feeding means operatively associated with said retort, a thermostatic switch control in said flue, a water heater of the exchanger type, an auxiliary gas discharge pipe communicating with said combustion chamber below said main discharge and operatively connected to said water heater, an inverted funnel in said combustion chamber between the retort and the main discharge flue and connected to said pipe for communication therewith, said funnel being annularly spaced from the interior surface of the combustion chamber wall to form a passage for wall heating gases, an electric fan operatively associated with said exchanger for drawing products of combustion through said exchanger, a circuit including said fan and a thermostatic switch responsive to the temperature of the water being heated for controlling said fan, and an electrical circuit including said switch controls in parallel relation, the thermostatic switch control being operatively associated in series in said circuit, whereby said retort operation is controlled by flue temperatures.

2. In a combined water and warm air heating system, the combination of a warm air furnace including a combustion chamber, a casing about said chamber forming an air space in heat exchange relation with said chamber, a fuel burning unit in said combustion chamber, a warm air discharge from said space for house heating, a main discharge outlet for products of combustion from said chamber, an auxiliary gas discharge pipe below said main discharge leading from said combustion chamber to the exterior thereof, an inverted funnel in said combustion chamber between said unit and said outlet and axially disposed above and in spaced relation to said burner unit and connected to said pipe to discharge auxiliary gas into said pipe, said funnel being spaced from the wall of said chamber to form a passage for hot gases rising along said wall, a heat exchanger comprising a casing and a water circulating coil therein, said casing being connected to said auxiliary gas discharge pipe to receive discharged gases, and having an outlet to exhaust said gases, means for drawing auxiliary gas through said exchange casing, said drawing means being operatively associated with said exchanger, and means responsive to the temperature of the water in said coil for controlling said drawing means, said responsive means being operatively associated with said drawing means.

3. In a combined water and warm air heating system according to claim 2, including means including an electric circuit associated with the burner unit, said means being responsive to the temperature of the combustion gases, said electric circuit being operatively associated with said fuel burning unit for controling said fuel burning unit.

4. In a combined water and warm air heating system, the combination of a warm air furnace including a combustion chamber, said chamber having an upper main discharge outlet and a lower auxiliary discharge outlet, a fuel burner unit in said combustion chamber, tubular means in said combustion chamber in the path of products of combustion from said unit disposed between said main outlet and said fuel burning unit and spaced from the wall of said chamber to form an annular passage for products rising to said main discharge outlet, said means having an axially disposed inlet for said products, a pipe connected between said inlet and said auxiliary discharge outlet, a water heater of the exchange type operatively connected to said pipe, an electric circuit including water temperature responsive means operatively associated with said water heater, said circuit also including a fan operatively associated with said exchanger for drawing auxiliary gas through said heater.

5. In a combined water and warm air heating system, the combination of a warm air furnace including a combustion chamber having a main gas discharge flue and a casing forming an air space in heat exchange relation to said chamber for home heating, a fuel burning unit in said chamber, a water heater of the exchange type, an auxiliary gas discharge pipe leading from said combustion chamber below said main gas discharge and connected to communicate with said water heater, an inverted funnel in said combustion chamber between said burner unit and said main gas discharge flue and connected to and forming an inlet to said auxiliary discharge pipe, said funnel being mounted axially spaced above said burner unit and forming with the wall of said chamber an annular gas passage for heating said external air space, and means operatively associated with said exchanger for drawing gases from said combustion chamber into said funnel and through said exchanger for water heating.

6. In a combined water and warm air heating system in accordance with claim 5, wherein an electrical circuit operatively associated with said drawing means including an aquastat responsive to the temperature of the water in said exchanger controls said drawing means.

7. A combined water and warm air heating system in accordance with claim 5, wherein a fuel feeding unit is connected to the burner unit, and a manually settable electric timer is operatively associated with said fuel unit for effecting periodic operation of the latter in a predetermined sequence.

References Cited in the file of this patent

UNITED STATES PATENTS

| Number | Name | Date |
| --- | --- | --- |
| 340,760 | Carvalho | Apr. 27, 1886 |
| 2,054,041 | Persons | Sept. 8, 1936 |
| 2,083,745 | Risdon | June 15, 1937 |
| 2,084,880 | Wotring | June 22, 1937 |
| 2,199,183 | Lippincott | Apr. 30, 1940 |
| 2,252,046 | Steele | Aug. 12, 1941 |
| 2,455,988 | Fife | Dec. 14, 1948 |